United States Patent
Simkin et al.

(10) Patent No.: US 9,912,782 B2
(45) Date of Patent: Mar. 6, 2018

(54) METHOD AND APPARATUS FOR RECOVERY IN A COMMUNICATION SYSTEM EMPLOYING REDUNDANCY

(71) Applicant: MOTOROLA SOLUTIONS, INC., Schaumburg, IL (US)

(72) Inventors: Yakov V. Simkin, Northbrook, IL (US); Madhusudan K. Pai, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 300 days.

(21) Appl. No.: 14/977,881

(22) Filed: Dec. 22, 2015

(65) Prior Publication Data
US 2017/0180512 A1    Jun. 22, 2017

(51) Int. Cl.
*G06F 15/16*    (2006.01)
*H04L 29/06*    (2006.01)
*H04L 12/26*    (2006.01)
*H04W 76/02*    (2009.01)

(52) U.S. Cl.
CPC .......... *H04L 67/42* (2013.01); *H04L 43/0811* (2013.01); *H04L 65/4076* (2013.01); *H04W 76/028* (2013.01)

(58) Field of Classification Search
None
See application file for complete search history.

(56) References Cited

U.S. PATENT DOCUMENTS

| 8,559,940 B1 | 10/2013 | Enzmann et al. |
| 8,982,902 B1 | 3/2015 | Naganathan et al. |
| 2006/0252441 A1 | 11/2006 | Harris et al. |
| 2009/0237702 A1* | 9/2009 | Yun .................... H04N 1/00244 358/1.13 |
| 2011/0083036 A1* | 4/2011 | Pawlowski ......... H04L 67/1034 714/4.2 |
| 2015/0304603 A1* | 10/2015 | Yoon ...................... H04N 7/147 348/14.07 |

FOREIGN PATENT DOCUMENTS

GB    2420252    5/2006

* cited by examiner

*Primary Examiner* — Brian Whipple

(57) ABSTRACT

A method and apparatus are disclosed that provide expedited recovery in a communication system employing redundancy. The method includes establishing connections between a second server and each of a first mobile device and a second mobile device; receiving, by the second server from the first mobile device, an indication that a first server has recovered, wherein the first server and the second server are redundant servers and wherein the second server acts as a backup server for the first server; and based on the indication received from the first mobile device, informing, by the second server, a second mobile device of the recovery of the first server, thereby expediting a connecting, or a re-connecting, of the second mobile device to the first server.

18 Claims, 4 Drawing Sheets

METHOD AND APPARATUS FOR RECOVERY IN A COMMUNICATION SYSTEM EMPLOYING REDUNDANCY

FIELD OF THE INVENTION

The present invention relates generally to wireless communication systems and, in particular, to recovery in a wireless communication system that employs system redundancy.

BACKGROUND OF THE INVENTION

Fault-tolerant systems provide communications service to mobile devices by switching serving network elements from a failed network element to a redundant network element. Typically, a network administrator assigns one redundant network element to be the preferred, or primary, network element for mobile devices to receive a network service while assigning another redundant network element to serve as the backup network element, that is, to serve the mobile devices only if the primary network element fails. In such systems, problems may arise regarding the timely switching over of mobile devices from the backup network element to the primary network element when the primary network element recovers.

For example, when the primary network element fails, then the mobile devices that were served by the primary network element switch over to the backup network element. Typically, such mobile devices then periodically retry the primary network element to see if it has recovered. When the primary network element does recover, some of the mobile devices that it had been serving may now be idle. Since each mobile device is independently retrying the primary network element, not all mobile devices will detect the recovery of the primary network element at the same time. Therefore, idle mobile devices will only gradually switch over to the primary network element, over a period of time that depends on the frequency of retrying connection with the primary network element. Meanwhile, other mobile devices that are actively using a service provided by the backup network element may not want to switch back to the primary network element. Hence, the result is that until all mobile devices switch back to the primary network element, some mobile devices may be on the backup network element and some mobile devices may be on the primary network element and these two populations of mobile devices may not be able to communicate with each other using the service provided by the primary and backup network elements, resulting in a corresponding service outage.

BRIEF DESCRIPTION OF SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
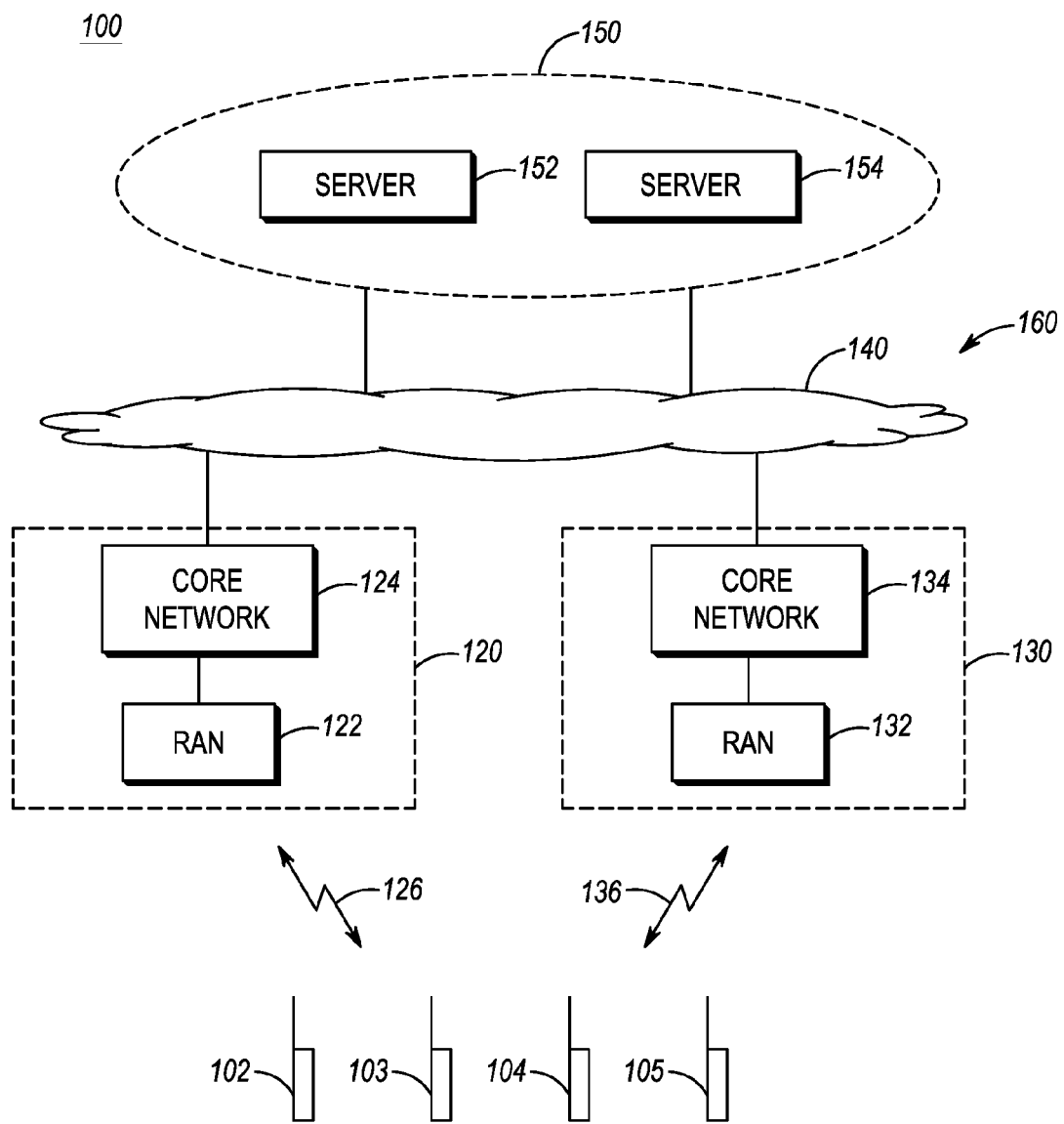
FIG. 1 is a block diagram of a wireless communication system in accordance with various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A method and apparatus are disclosed that provide expedited recovery in a communication system employing redundancy. The method includes establishing connections between a second server and each of a first mobile device and a second mobile device; receiving, by the second server from the first mobile device, an indication that a first server has recovered, wherein the first server and the second server are redundant servers and wherein the second server acts as a backup server for the first server; and based on the indication received from the first mobile device, informing, by the second server, a second mobile device of the recovery of the first server, thereby expediting a connecting, or a re-connecting, of the second mobile device to the first server.

In one embodiment of the present invention, a method is disclosed for recovery in a communication system employing redundancy. The method includes establishing connections between a second server and each of a first mobile device and a second mobile device; receiving, by the second server from the first mobile device, an indication that a first server has recovered, wherein the first server and the second server are redundant servers and wherein the second server acts as a backup server for the first server; and based on the indication received from the first mobile device, informing, by the second server, a second mobile device of the recovery of the first server.

Another embodiment of the present invention encompasses an apparatus for recovery in a communication system employing redundancy. The apparatus includes a server comprising a network interface, a processor, and an at least one memory device that is configured to store a set of instructions that, when executed by the processor, cause the processor to perform the following functions: establish connections with each of a first mobile device and a second mobile device; receive, from the first mobile device, an indication that another server has recovered, wherein the server and the another server are redundant servers and wherein the server acts as a backup server for the another server; and based on the indication received from the first mobile device, inform the second mobile device of the recovery of the another server.

The present invention may be more fully described with reference to FIGS. 1-4B. FIG. 1 is a block diagram of a wireless communication system 100 in accordance with some embodiments of the present invention. Communication system 100 includes multiple wireless mobile devices 102-105 (four shown), for example but not limited to a cellular telephone, a smart phone, a land mobile radio (LMR), a vehicle modem, a server mounted in vehicle, or a tablet, laptop, or body-worn computing device equipped for wireless communications, etc. In various radio technologies, a mobile device such as mobile devices 102-105 may be referred to as a user equipment (UE), a subscriber station (SS), an access terminal (AT), a mobile station (MS), or the like. Each mobile device 102-105 includes one or more application layer clients which communicate with corresponding elements of a service network 150.

Communication system 100 further includes one or more wireless communication networks 120, 130 (two shown), such as a first network 120 that operates according to a first wireless communication protocol and a second network 130 that operates according to a second wireless communication protocol. First access network 120 includes a first radio access network (RAN) 122 that is coupled to a first core network 124 and that provides wireless communications service to mobile devices residing in a coverage area of the first RAN via a first air interface 126 and the first wireless communication protocol. Second access network 130 includes a second RAN 132 that is coupled to a second core network 134 and that provides wireless communications service to mobile devices residing in a coverage area of the second RAN via a second air interface 136 and the second wireless communication protocol. Each of air interfaces 126 and 136 includes an uplink and a downlink, which uplinks and downlinks each includes multiple traffic channels and multiple signaling channels. In various embodiments of the present invention, each of the first and second networks 120, 130 may be a same type of network or a different type of network. Further, although RANs 122 and 132 are depicted as being coupled to different core networks, in other embodiments of the present invention RANs 122 and 132 may share a same core network.

Communication system 100 further includes local agency or enterprise service network 150 that is accessible by mobile devices 102-105 via networks 120 and 130 and a data network 140, such as a private network or the Internet. Service network 150 includes multiple servers 152, 154 (two shown), that is, application functions (AFs), that are each capable of providing a same application layer service. For example, each of servers 152 and 154 may be a Group Management Server, for example, a Push-to-Talk (PTT) Server, a Voice over Internet Protocol (VoIP) server, an MVPN server, a messaging server, a video server, and so on that may be deployed as geographically redundant pairs. RANs 122 and 132, core networks 124 and 134, data network 240, and servers 152, 154 collectively comprise an infrastructure 160 of communication system 100 and, correspondingly, each may be referred to as an infrastructure element of communication system 100.

Figure 2:
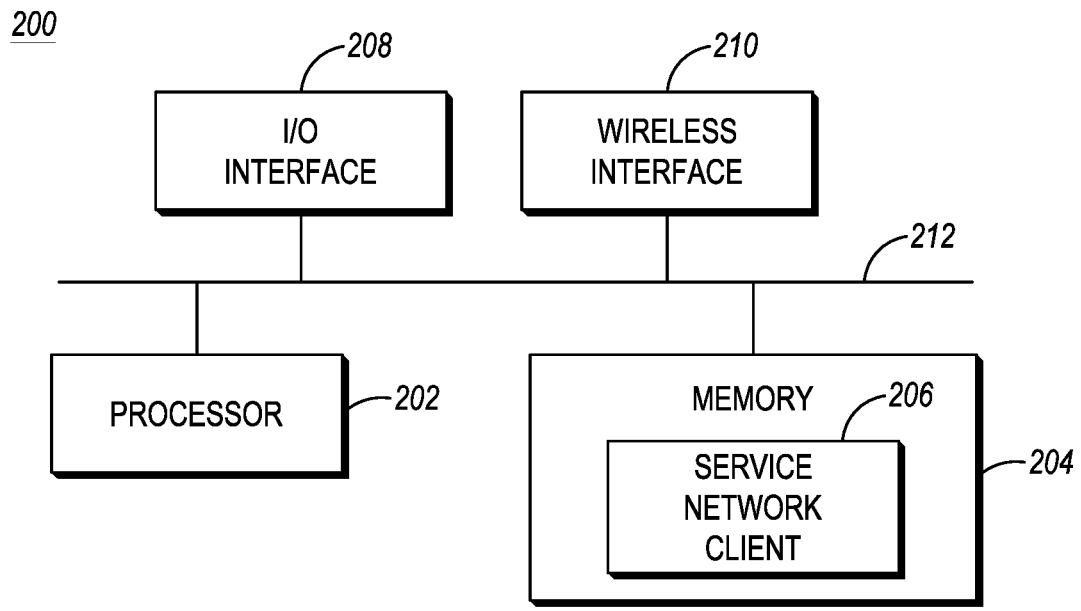
FIG. 2 is a block diagram of a user equipment of the communication system of FIG. 1 in accordance with an embodiment of the present invention.

Referring now to FIG. 2, a block diagram of a mobile device 200, such as mobile devices 102-105, is provided in accordance with some embodiments of the present invention. Mobile device 200 generally includes a processor 202, at least one memory device 204, one or more input/output (I/O) interfaces 208, and one or more wireless interfaces 210 (one shown). It should be appreciated by those of ordinary skill in the art that FIG. 2 depicts mobile device 200 in an oversimplified manner, and a practical embodiment may include additional components and suitably configured processing logic to support known or conventional operating features that are not described in detail herein. The components (202, 204, 208, 210) of mobile device 200 are communicatively coupled via a local interface 212. Local interface 212 can be, for example but not limited to, one or more buses or other wired or wireless connections, as is known in the art. Local interface 212 can have additional elements, which are omitted for simplicity, such as controllers, buffers (caches), drivers, repeaters, and receivers, among many others, to enable communications. Further, local interface 212 may include address, control, and/or data connections to enable appropriate communications among the aforementioned components.

Mobile device 200 operates under the control of processor 202, such as one or more microprocessors, microcontrollers, digital signal processors (DSPs), combinations thereof or such other devices known to those having ordinary skill in the art. Processor 202 operates the corresponding mobile device according to data and instructions stored in the at least one memory device 204, such as random access memory (RAM), dynamic random access memory (DRAM), and/or read only memory (ROM) or equivalents thereof, that stores data and instructions that may be executed by the corresponding processor so that the mobile device may perform the functions described herein.

The one or more I/O interfaces 208 may include user interfaces that allow a user to input information in, and receive information from, mobile device 200. For example, the user interfaces may include a keypad, a touch screen, a scroll ball, a scroll bar, buttons, bar code scanner, and the like. Further, the user interfaces may include a display device such as a liquid crystal display (LCD), touch screen, and the like for displaying system output. I/O interfaces 208 also can include, for example, a serial port, a parallel port, a small computer system interface (SCSI), an infrared (IR) interface, a universal serial bus (USB) interface, and the like for communicating with, or coupling to, an external device. The one or more wireless interfaces 210 facilitate an exchange of wireless communications with an access network, such as access networks 122 and 132. For example, the one or more wireless interfaces 210 may include transceivers for wireless wide area communications, such as a wireless area network (WAN), and/or for wireless local area network (WLAN) communications.

The data and instructions maintained by at least one memory device 204 include software programs that include an ordered listing of executable instructions for implementing logical functions. For example, the software in at least one memory device 304 includes a suitable operating system (O/S) and programs. The operating system essentially controls the execution of other computer programs, and provides scheduling, input-output control, file and data management, memory management, and communication control and related service. The programs may include various applications, add-ons, etc. configured to provide user functionality with mobile device 200, for example, at least one memory device 204 maintains a service network client 206 that, when executed by processor 202, facilitates a peer-to-peer exchange of signaling and traffic with a server 152, 154 of service network 150.

Figure 3:
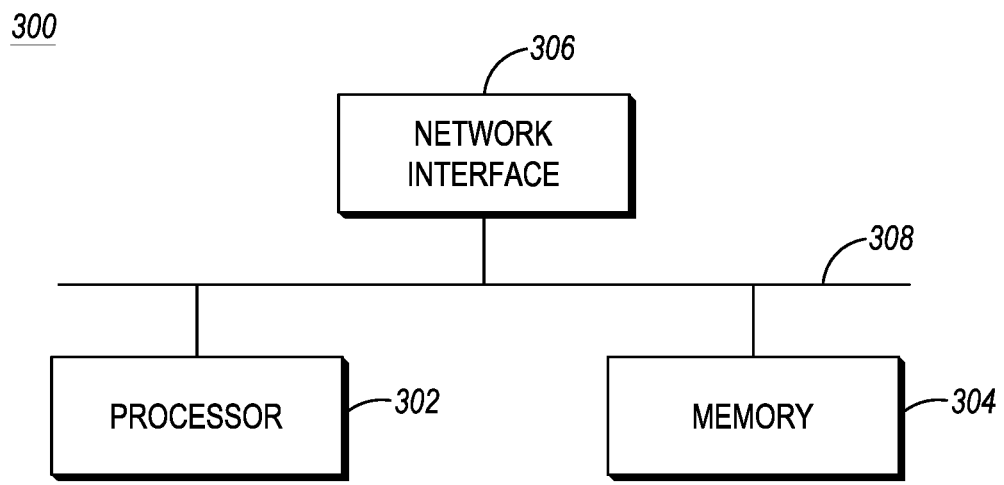
FIG. 3 is a block diagram of an application server of the communication system of FIG. 1 in accordance with an embodiment of the present invention.

Referring now to FIG. 3, a block diagram is provided of a server 300, such as servers 152 and 154, in accordance with an embodiment of the present invention. Server 300 includes a processor 302, such as one or more microprocessors, microcontrollers, digital signal processors (DSPs), combinations thereof or such other devices known to those having ordinary skill in the art. Server 300 further includes an at least one memory device 304, such as random access memory (RAM), dynamic random access memory (DRAM), and/or read only memory (ROM) or equivalents thereof, that is in communication with a corresponding processor 302, via a corresponding local interface 308. At least one memory device 304 stores data and programs that may be executed by processor 302 and that allows the server to perform all functions necessary to operate in communication system 100.

Server 300 further includes one or more network interfaces 306 (one shown) that is in communication with processor 302 via local interface 308 and that provides for interfacing with other infrastructure elements of communication system 100, such as data network 140 and, via the data network, with networks 120 and 130. Local interface 308 can be, for example but not limited to, one or more buses or other wired or wireless connections, as is known in the art. Local interface 308 can have additional elements, which are omitted for simplicity, such as controllers, buffers (caches), drivers, repeaters, and receivers, among many others, to enable communications. Further, local interface 308 may include address, control, and/or data connections to enable appropriate communications among the aforementioned components of the server.

Figure 4A:
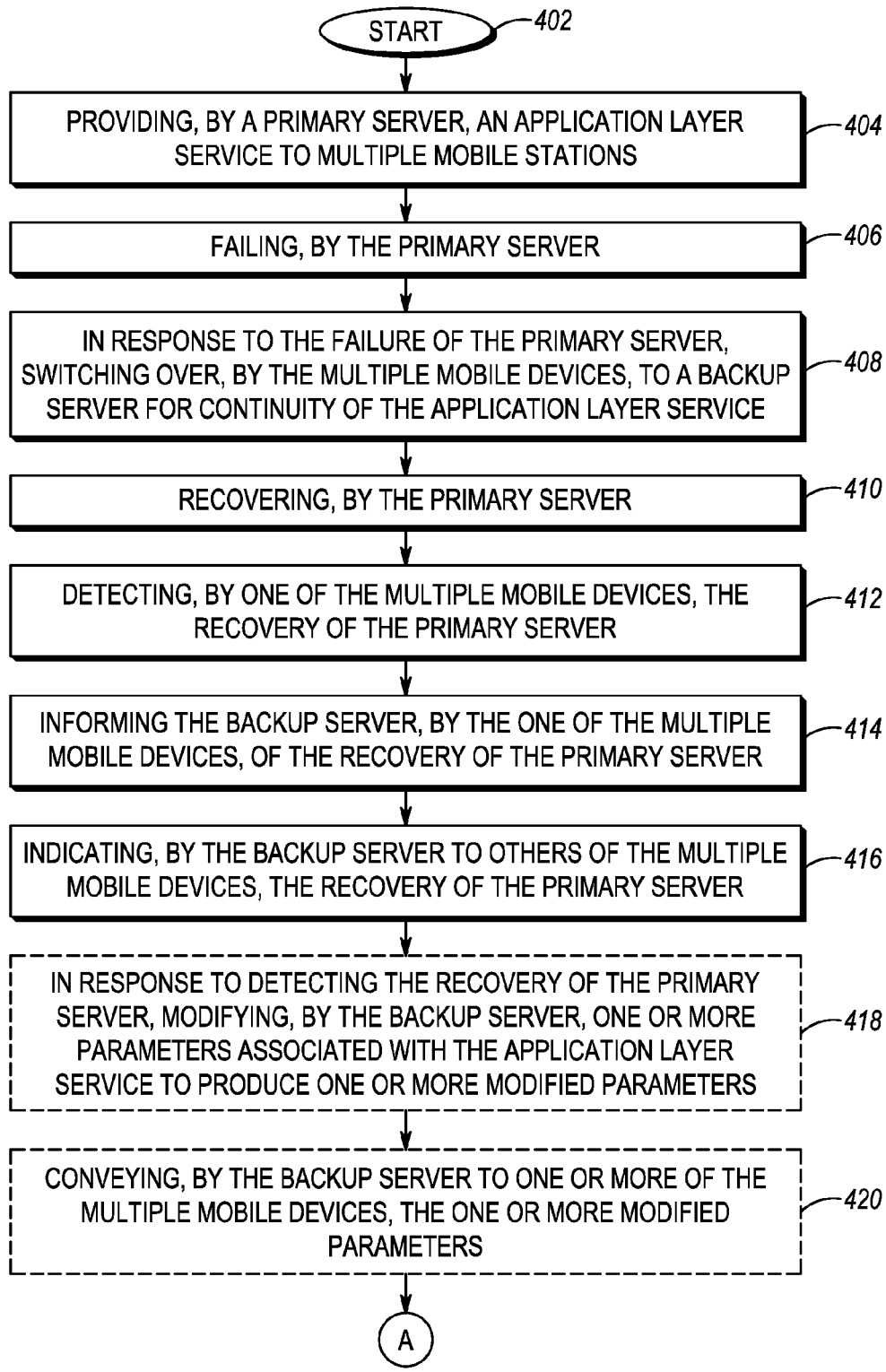
FIG. 4A is a logic flow diagram illustrating a method executed by the communication system of FIG. 1 in performing recovery in accordance with some embodiments of the present invention.
Figure 4B:
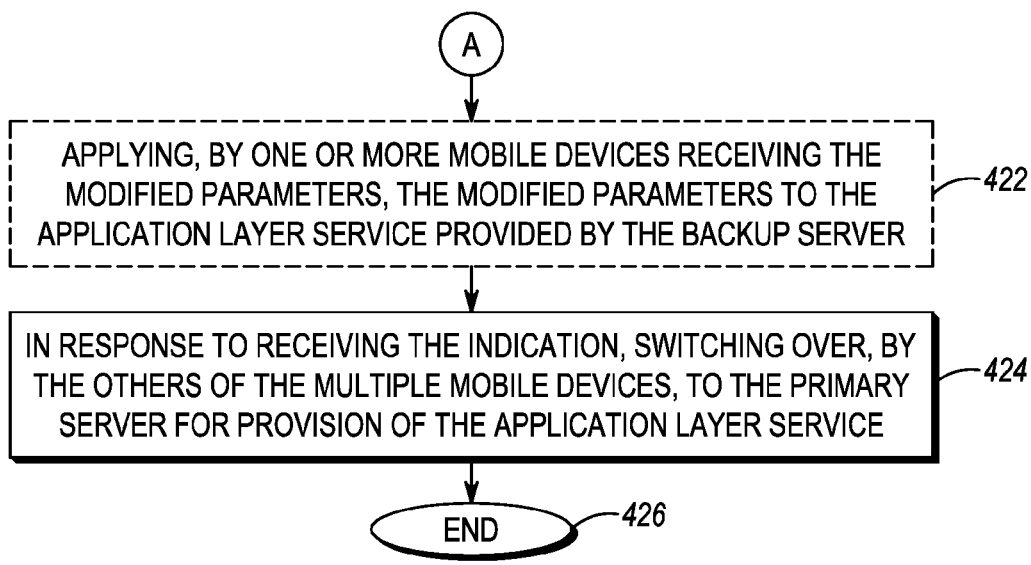
FIG. 4B is a continuation of the logic flow diagram of FIG. 4A illustrating a method executed by the communication system of FIG. 1 in performing recovery in accordance with some embodiments of the present invention.

Referring now to FIGS. 4A and 4B, a logic flow diagram 400 is provided that illustrates a method executed by communication system 100 in performing recovery in accordance with some embodiments of the present invention. For the purpose of illustrating the principles of the present invention, it is assumed that each of mobile devices 102-105 already is registered with communication system 100 and service network 150. Further, it is assumed that the multiple servers 152, 154 are redundant servers, that is, each of the multiple servers 152, 154 is capable of providing a same application layer service as the other servers of the multiple servers 152, 154. Correspondingly, a first server 152 of the multiple servers 152, 154 may serve as a primary server and a second server 154 of the multiple servers 152, 154 may serve as a backup server (that is, as a backup to primary server 152) with respect to provision of the application layer service.

Logic flow diagram 400 begins (402) when each of the multiple mobile devices 102-105 is connected to primary server 152 for a provision (404) of an application layer service. From another perspective, primary server 152 is providing the application layer service to each of mobile devices 102-105. As noted above, server 152 is the primary provider of the application layer service and is referred to as the primary server, and server 154 is the backup provider of the application layer service and is referred to as the backup server.

Typically, an administrator of service network 150 will designate which of the multiple servers 152, 154 will serve as the primary server and which of the multiple servers 152, 154 will serve as the backup server. The designation of the primary and backup servers may be made based on any number of factors, including server utilization, server availability, server location, and so on. Further, the administrator of service network 150 may provide to each of mobile devices 102-105 routing information for each of primary server 152 and backup server 154, such as a Domain Name Server (DNS) hostname or an Internet Protocol (IP) address, so that the mobile devices can access the server for a provision of the application layer service. For example, the administrator may provide a service network configuration file to each mobile device, upon registration with service network 150, which indicates which of servers 152, 154 is the primary server and the backup server and includes routing information for each server. By way of another example, each server 152, 154 may broadcast one or more overhead messages that provide server configuration information, including identifying application layer services provided by the server and routing information for the server. In response to receiving the configuration file/information, each mobile device 102-105 stores the configuration file/information in the at least one memory device 204 of the mobile device, and more particularly in the service network client 206.

During operation of primary server 152, events or information provided to primary server 152 also may be provided to backup server 154. Alternatively or in addition, backup server 154 periodically or intermittently may sync up with primary server 152 via other infrastructure elements to obtain events and information provided to the primary server. Thus backup server 154 may have the information necessary to provide the application layer service to mobile devices 102-105.

At some point in time, primary server 152 fails and may lose (406) its connection to the multiple mobile devices 102-105. For example, primary server 152 may go down, go offline, or for any other reason such as loss of IP connectivity in the network, may lose its ability to provide the application layer service to the mobile devices. In response to the failure of primary server 152, each of the multiple mobile devices 102-105 switches over (408) to backup server 154 for continuity of the application layer service. That is, each of the multiple mobile devices 102-105 establishes a connection with backup server 154 and the backup server takes over as the provider of the application layer service to the multiple mobile devices.

Subsequent to the failure of primary server 152, each of the multiple mobile devices periodically, or intermittently, retries the primary server to see if it has recovered. When primary server 152 recovers (410) and comes back on-line, a first mobile device of the multiple mobile devices 102-105, such as mobile device 102, successfully pings the primary server and detects that the primary server has recovered and is back on line.

In response to detecting (412) the recovery of primary server 152, the first mobile device 102 resumes using the primary server for provision of the application layer service. For example, if first mobile device 102 has lost its connection to primary server 152, then the first mobile device reconnects to, that is, establishes a new connection with, the primary server. Further, in response to detecting the recovery of primary server 152, mobile device 102 informs (414) backup server 154 that primary server 152 has recovered. For example, mobile device 102 may convey a PRIMARY_SERVER_RECOVERY_DETECTED message to backup server 154, which PRIMARY_SERVER_RECOVERY_

DETECTED message identifies primary server 152 and may further identify the application layer service being provided to mobile device 102 by the primary server. However, as backup server 154 is aware that it is a backup server to primary server 152, the mere recovery of primary server 152 should suffice to alert backup server 154 that the backup server is to resume backup status.

In response to receiving, from mobile device 102, information indicating that primary server 152 has recovered, backup server 154 indicates (416), to the other mobile devices 103-105, that is, a second mobile device 103, a third mobile device 104, and a fourth mobile device 105, the recovery of primary server 152, that is, that primary server 152 is again available for the provision of the application layer service. For example, backup server 154 may broadcast a PRIMARY_SERVER_RECOVERED message, which message identifies primary server 152 and further may identify the application layer service being provided by backup server 154 and that is again available at the primary server. In other embodiments, instead of or in addition to broadcasting the PRIMARY_SERVER_RECOVERED message, backup server 154 may convey the PRIMARY_SERVER_RECOVERED message to each mobile device 103-105 over the connection established between the backup server and mobile device. Alternatively, backup server 154 may wait for a certain threshold of mobile devices to send the PRIMARY_SERVER_RECOVERY_DETECTED message prior to sending PRIMARY_SERVER_RECOVERED to the entire population of connected mobile devices.

In response to receiving the indication of the recovery of primary server 152, each of the other mobile devices 103-105 switches over (424) to the primary server from backup server 154. In various embodiments of the present invention, mobile devices 103-105 may or may not, at the time of the recovery of primary server 152, be connected to both the backup server and the primary server. For example, a mobile device that was connected to primary server 152 may or may not relinquish that connection when the primary server fails. If the mobile device relinquishes the connection to primary server 152 when the primary server fails, then in response to receiving the indication of the recovery of the primary server, the mobile device may re-establish a connection with the primary server and use that connection to obtain services from the primary server instead of obtaining such services from the backup server. If the mobile device maintains its connection to primary server 152 even after the primary server has failed, then in response to receiving the indication of the recovery of the primary server, the mobile device may resume using the connection with the primary server for obtaining services from the primary server instead of obtaining such services from the backup server.

For example, mobile devices that are in an idle state may, in response to receiving a message indicating that that primary server 152 is again available for the provision of the application layer service, immediately switch over to the primary server. On the other hand, mobile devices that are in an active state, that is, that are actively engaged in a communication session with backup server 154, may wait until completion of the communication session before switching over the primary server 152.

In order to facilitate a switchover from backup server 154 to primary server 152, backup server 154 optionally may modify (418) one or more parameters associated with the application layer service being provided to a mobile device actively engaged with the backup server to produce one or more modified parameters. Backup server 154 then may convey (420) the one or more modified parameters to the mobile devices 103-105 that have not yet switched over the primary server and inform the mobile devices to use the one or more modified parameters for the remainder of the mobile devices' sessions with the backup server. The mobile devices 103-105 that are in an active state and are using the application layer service, and that have not yet switched over the primary server, then may apply (422) the one or more modified parameters to the remainder of their sessions with the backup server, that is, until their sessions end with the backup server and they switch over to primary server 152.

For example, backup server 154 may modify an attribute associated with the application layer service and inform the mobile devices to use this new attribute for the remainder of the mobile devices' sessions with the backup server. For example, backup server 154 may modify a hang timer (that is, a timer limiting an idle time of a communication session, which communication session could be prolonged if a talk burst is initiated by any of its participants) of in-progress calls to a lower value than the current hang timer. For example, if the backup server reduces the hang timer to zero (0), then the call will end at the end of a talk burst and the mobile device (which became idle) will switch over to the primary server at the end of the talk burst rather than at the end of a lengthy conversation. Another example of an attribute that the backup server may modify is a Session Initiation Protocol (SIP) expiry timer for pre-affiliated Open Mobile Alliance (OMA) chat groups. Still other examples of modifications of parameters associated with an application layer service include modifying network resources, such as evolved Multimedia Broadcast Multicast Service (eMBMS) resources, associated with the application layer service, for example, relinquishing network resources such as eMBMS bearers for inactive calls in favor of the primary server using these for new calls from mobile devices that have switched over to the primary server, and modifying unicast resources, for example, relinquishing unicast bearers established for idle users who will now switch over to the primary server over an interface such as 3GPP Rx to a LTE PCRF. Logic flow diagram 400 then ends (426).

The embodiments of the present invention preferably are implemented within each of mobile devices 102-105 and servers 152 and 154, and more particularly with or in software programs and instructions stored in the at least one memory devices 204, 304 and executed by the processors 202, 302 of the mobile devices and servers. However, one of ordinary skill in the art realizes that the embodiments of the present invention alternatively may be implemented in hardware, for example, integrated circuits (ICs), application specific integrated circuits (ASICs), and the like, such as ASICs implemented in one or more of mobile devices 102-105 and servers 152 and 154, and all references to 'means for' herein may refer to any such implementation of the present invention. Based on the present disclosure, one skilled in the art will be readily capable of producing and implementing such software and/or hardware without undo experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the expressions "air interface" and "wireless link" are intended to be used interchangeably herein.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for recovery in a communication system employing redundancy, the method comprising:
   establishing network connections between a second server and each of a first mobile device and a second mobile device;
   receiving, by the second server from the first mobile device, an indication that a first server has recovered, wherein the first server and the second server are redundant servers and wherein the second server acts as a backup server for the first server; and
   based on the indication received from the first mobile device, informing, by the second server, a second mobile device of the recovery of the first server.

2. The method of claim 1, wherein establishing the connections between the second server and each of the first mobile device and the second mobile device comprises establishing the connections between the second server and each of the first mobile device and the second mobile device in response to a failure of the first server.

3. The method of claim 1, further comprising:
   establishing, by the first server, connections with each of the first mobile device and the second mobile device;
   losing, by the first server, the connections between the first server and the first and second mobile devices; and
   wherein establishing the connection between the second server and each of the first mobile device and the second mobile device comprises establishing the connections between the second server and each of the first mobile device and the second mobile device in response to the first server losing the connections between the first server and the first and second mobile devices.

4. The method of claim 1, further comprising:
   detecting, by the first mobile device, a recovery of the first server; and
   in response to detecting the recovery of the first server, conveying, by the first mobile device to the second server, the indication that the first server has recovered.

5. The method of claim 1, wherein the second mobile device is in an idle state and wherein the method further comprises:

receiving, by the second mobile device from the second server, information indicating the recovery of the first server; and in response to receiving the information indicating the recovery of the first server, immediately switching over, by the second mobile device, from the second server to the first server.

6. The method of claim 1, wherein the second mobile device is actively engaged in a communication session with the second server and wherein the method further comprises:

receiving, by the second mobile device from the second server, information indicating the recovery of the first server; and waiting, by the second mobile device, until completion of the communication session before switching over to the first server.

7. The method of claim 1, further comprising:

in response to establishing the connections with each of the first mobile device and the second mobile device, providing by the second server, an application layer service to each of the first mobile device and the second mobile device; and in response to receiving, from the first mobile device, the indication that the first server has recovered, modifying, by the second server, one or more parameters associated with the application layer service to produce one or more modified parameters.

8. The method of claim 7, wherein modifying one or more parameters associated with the application layer service comprises one or more of modifying an attribute associated with the application layer service, modifying an evolved Multimedia Broadcast Multicast Service (eMBMS) resource, and modifying a unicast resource.

9. The method of claim 8, wherein the attribute comprises a hang timer or a Session Initiation Protocol expiry timer.

10. The method of claim 7, further comprising:

conveying, by the backup server to the second mobile device, the one or more modified parameters; and informing the second mobile device to use the one or more modified parameters in association with the application layer service provided by the backup server.

11. An apparatus for recovery in a communication system employing redundancy, the apparatus comprising:

a server comprising:
  a network interface;
  a processor; and
  an at least one memory device that is configured to store a set of instructions that, when executed by the processor, cause the processor to perform the following functions:
    establish network connections with each of a first mobile device and a second mobile device;
    receive, from the first mobile device, an indication that another server has recovered, wherein the server and the another server are redundant servers and wherein the server acts as a backup server for the another server; and
    based on the indication received from the first mobile device, inform the second mobile device of the recovery of the another server.

12. The apparatus of claim 11, further comprising the first mobile device and wherein the first mobile device is configured to:

detect a recovery of the another server; and in response to detecting the recovery of the another server, convey, to the server, the indication that the another server has recovered.

13. The apparatus of claim 11, further comprising the second mobile device and wherein the second mobile device is configured to:

when in an idle state, receive, from the server, information indicating the recovery of the another server; and in response to receiving the information indicating the recovery of the another server, immediately switch over from the server to the another server.

14. The apparatus of claim 11, further comprising the second mobile device and wherein the second mobile device is configured to:

when the second mobile device is actively engaged in a communication session with the server, receive, from the server, information indicating the recovery of the another server; and wait until completion of the communication session before switching over to the another server.

15. The apparatus of claim 11, wherein the at least one memory device is configured to store a set of instructions that, when executed by the processor, cause the processor to perform the following functions:

in response to establishing the connections with each of the first mobile device and the second mobile device, provide an application layer service to each of the first mobile device and the second mobile device; and in response to receiving, from the first mobile device, the indication that the another server has recovered, modify one or more parameters associated with the application layer service to produce one or more modified parameters.

16. The apparatus of claim 15, wherein the at least one memory device is configured to store a set of instructions that, when executed by the processor, cause the processor to modify one or more parameters associated with the application layer service by one or more of modifying an attribute associated with the application layer service, modifying an evolved Multimedia Broadcast Multicast Service (eMBMS) resource, and modifying a unicast resource.

17. The apparatus of claim 16, wherein the attribute comprises a hang timer or a Session Initiation Protocol expiry timer.

18. The apparatus of claim 15, wherein the at least one memory device is configured to store a set of instructions that, when executed by the processor, cause the processor further to perform the following functions:

convey, to the second mobile device, the one or more modified parameters; and inform the second mobile device to use the one or more modified parameters in association with the application layer service provided by the server.

\* \* \* \* \*